(12) United States Patent
Creamer et al.

(10) Patent No.: US 7,212,623 B2
(45) Date of Patent: May 1, 2007

(54) METHOD FOR TELECOMMUNICATIONS SERVICE-TO-SERVICE ASYNCHRONOUS COMMUNICATIONS USING A CONTEXT CACHE

(75) Inventors: Thomas E. Creamer, Boca Raton, FL (US); Zygmunt A. Lozinski, Papworth Everard (GB); Victor S. Moore, Boynton Beach, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/246,255

(22) Filed: Sep. 17, 2002

(65) Prior Publication Data

US 2004/0052349 A1 Mar. 18, 2004

(51) Int. Cl.
*H04M 7/00* (2006.01)
(52) U.S. Cl. .......................... 379/221.08; 379/221.13; 379/265.01
(58) Field of Classification Search ........... 379/221.08, 379/221.13, 265.01
See application file for complete search history.

(56) References Cited

U.S. PATENT DOCUMENTS

| | | | | |
|---|---|---|---|---|
| 5,625,681 A * | 4/1997 | Butler, II | ............... | 379/221.02 |
| 5,878,126 A * | 3/1999 | Velamuri et al. | ........... | 379/219 |
| 6,016,520 A | 1/2000 | Facq et al. | ..................... | 710/33 |
| 6,130,939 A * | 10/2000 | Cochinwala et al. | ... | 379/220.01 |
| 6,205,467 B1 | 3/2001 | Lambrecht et al. | ......... | 709/108 |
| 6,366,658 B1 * | 4/2002 | Bjornberg et al. | ..... | 379/221.08 |
| 6,625,273 B1 * | 9/2003 | Ashdown et al. | ...... | 379/221.13 |
| 6,823,048 B2 * | 11/2004 | Gillespie | ................. | 379/88.19 |
| 2002/0137495 A1 * | 9/2002 | Gabrysch | .................... | 455/414 |
| 2005/0160139 A1 * | 7/2005 | Boucher et al. | ............ | 709/203 |

OTHER PUBLICATIONS

*Cell Directory Service—Single Clerk per System on MVS / OS400 Distributed Computing Environment*, IBM Technical Disclosure Bulletin, Vo. 38, No. 08, pp. 299-303, (Aug. 1995).
A. Fekete, et al., *Implementing Sequentially Consistent Shared Objects Using Broadcast and Point-To-Point Communication*, IEEE, pp. 439-449, (1995).
X. Su, et al., *Source Routing in Networks With Uncertainty: Inference, Sensitivity and Path Caching*, IEEE, pp. 460-464, (2000).
V. Vellanki, et al., *Domain Caching: Building Web Services for Live Events*, IEEE, pp. 133-142, (2001).
U.S. Appl. No. 09/583,318, filed May 30, 2000, Stern et al.
U.S. Appl. No. 10/172,410, filed Jun. 14, 2002, Creamer et al.

* cited by examiner

*Primary Examiner*—Ahmad F. Matar
*Assistant Examiner*—Karen Le
(74) *Attorney, Agent, or Firm*—Akerman Senterfitt

(57) ABSTRACT

A method of communication among telephony services using an event context cache can include, in a messaging telephony service, receiving a telephony event from a node in the public switched telephony network specifying a called directory number, a calling directory number, and service context data. The service context data can be stored as an entry within the event context cache. The event context cache can be accessible by at least one other telephony service. The entry can be associated with a key for the event context cache. The key can be specified by the called directory number and the calling directory number.

26 Claims, 3 Drawing Sheets

| Event Context Cache 305 | | 405 |
|---|---|---|
| Called number | Calling number | Service context data |
| 123 456 7890 | 234 567 8901 | data |
| 345 678 9012 | 456 789 0123 | data |
| 567 890 1234 | 678 901 2345 | data |
| ⋮ | ⋮ | ⋮ |
| 789 012 3456 | 890 123 4567 | data |

METHOD FOR TELECOMMUNICATIONS SERVICE-TO-SERVICE ASYNCHRONOUS COMMUNICATIONS USING A CONTEXT CACHE

BACKGROUND OF THE INVENTION

1. Technical Field

The invention relates to the field of telephony and, more particularly, to exchanging information between service logic components in a telephony network.

2. Description of the Related Art

Telecommunication companies continually create new telephony services and/or features (hereafter "services") to be offered to subscribers. Often, these services require the interaction of multiple service logic components. One common example is call control service logic and transaction service logic. While the call control service logic is associated with setting up the voice communication aspects of a telephone call, the transaction service logic provides the foundation for non-voice processing aspects of a telephone service such as 800 number translation, database querying, Short Message Service (SMS), Local Number Portability, Wireless Application Protocol (WAP), and other transaction-based services or service components. Thus, to implement a given telephony service, call control service logic often must interact with transaction service logic.

For example, if a telephone call is to be transferred to another directory number as a result of a number translation performed by the transaction service logic, the call control service logic must be able to obtain the call transfer information from the transaction service logic. That is, responsive to receiving a telephone call, the call control service logic must query the originating service, in this case the transaction service logic, to determine how to handle the telephone call. Traditionally, this interaction between different service logic components has been accomplished through the use of a service-to-service messaging protocol.

Through the service-to-service messaging protocol, a receiving service can determine contextual information regarding a given telephone call. Accordingly, the receiving service, in this case the call control service logic, with reference to the contextual information, can process the telephone call. The service-to-service messaging mechanism, however, has disadvantages. One such disadvantage is that the originating service must remain active to provide information in the form of multiple messages to any receiving services in need of contextual information to complete a call. The originating service becomes the "master" and the receiving service becomes the "slave". The originating service remains active solely to provide needed messaging functions for receiving services despite the fact that the primary function of the originating service has completed. In consequence, costly memory and processor resources are consumed for the duration of the service-to-service lifetime.

Another disadvantage is that the cost of updating a service-to-service messaging protocol can be very high. Notably, each service logic component that relies on the service-to-service messaging protocol must be updated along with the protocol itself. Thus, at a minimum, two service logic components must be updated for a given protocol enhancement. In consequence, multiple nodes within a telephony network may have to undergo a coordinated update process.

These types of issues have been a hindrance to the development of the Intelligent Network (IN) as well as Advanced Intelligent Network (AIN). Although multiple protocols such as SR-3511, 1129 CORE, CORE INAP, and the like have been developed, no global standard has emerged. Additionally, the cost model for maintaining a service control point (SCP) has begun to rival that of maintaining a telephony switch. Moreover, as services implemented using the SCP cost model are resource intensive, the need to utilize memory and processor resources for the duration of the service-to-service lifetime further increases the cost of service implementation, deployment, and maintenance.

SUMMARY OF THE INVENTION

The invention provides a solution for sharing signaling event data between two or more service logic components in a telephony system. For example, the invention can be used as an interface between a voice processing node and a messaging node in a telephony environment. In particular, an event context cache can be communicatively linked with two or more service logic components of a telephony system. As such, the present invention can eliminate the need for the coordinated implementation of a service-to-service messaging protocol within each telephony service component. The service logic components can make entries within the event context cache and then process other events. Other service logic components can access the information within the event context cache. Accordingly an originating service logic component need not remain in focus or continue executing only to provide other service logic components with instruction messages.

One aspect of the present invention can include a method of communication among telephony services using an event context cache. The method can include, in a messaging telephony service, receiving a telephony event from a node in the public switched telephony network specifying a called directory number, a calling directory number, and service context data. The service context data can be stored as an entry within the event context cache, which can be accessed by at least one other telephony service. The entry can be associated with a key for the event context cache. The key, which can be a hash key, can be generated and specified with the called directory number and the calling directory number.

According to one embodiment of the present invention, the telephony event can be received via a parlay interface. The other telephony service can be a voice processing service. Notably, the service context data can specify a voice processing service to be executed. The voice processing telephony service can access the event context cache to determine how to process a received call. Accordingly, the messaging telephony service and the voice processing telephony service can communicate without the use of a service-to-service messaging protocol.

After the telephony event is received, the resources of the node in the public switched telephony network can be released. The entry and associated key in the event context cache can be removed upon expiration of a predetermined amount of time. The method also can include receiving a subsequent telephony event, determining whether an event context for the subsequent telephony event exists in the event context cache, and if not, storing service context data for the subsequent telephony event as an entry within the event context cache. The entry can be associated with a second key for the event context cache which can be specified by a called directory number and a calling directory number for the subsequent telephony event. If an event context for the subsequent telephony event exists in the event context cache, the event context can be refreshed.

Another aspect of the present invention can include a method of communication among telephony services using an event context cache. The method can include, within a voice processing telephony service, receiving a service request from a node in the public switched telephony network. The service request can specify a calling directory number and a called directory number. Responsive to receiving the service request, a key can be determined using the calling directory number and the called directory number. A determination can be made as to whether an entry exists in the event context cache which is associated with the key. If so, event context data from the entry can be retrieved from the event context cache to process the received service request in accordance with the entry. If not, a call recovery mechanism can be executed.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention provides a solution for sharing signaling event data between two or more service logic nodes in a telephony system. For example, the invention can be used as an interface between a voice processing node and a messaging node in a telephony environment. In particular, an event context cache can be communicatively linked with two or more service logic nodes of a telephony system. The service logic nodes can communicate via the event context cache which stores event context information to indicate to other service logic nodes and/or services how to process a received call.

Figure 1:
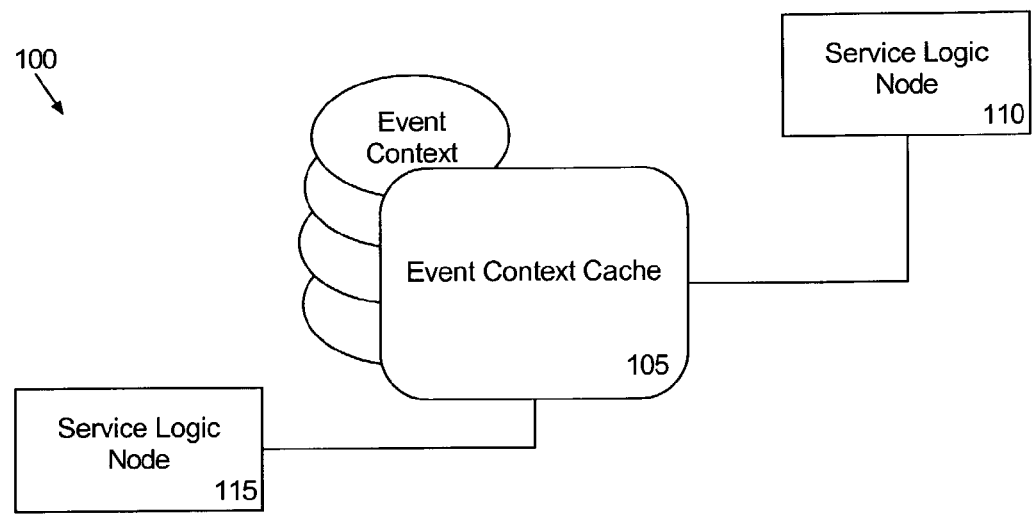
FIG. 1 is a schematic diagram illustrating an event context cache disposed between two service logic nodes in accordance with the inventive arrangements disclosed herein.

FIG. 1 is a schematic diagram illustrating a system 100 having an event context cache 105 disposed between two service logic nodes 110 and 115 in accordance with the inventive arrangements disclosed herein. The event context cache 105 can be implemented as one or more distributed computer systems, storage devices, and/or memory devices which can be communicatively linked to the service logic nodes 110 and 115. As such, the event context cache 105 can be used in place of service-to-service messaging protocols. Accordingly, as various signaling events are received by service logic node 110, for example, information regarding the received events can be placed as an entry within the event context cache 105. Thus, rather than service logic node 110 remaining active or "in scope" for responding to subsequent queries from service logic node 115, the resources of service logic node 110 can be devoted to another event and/or service as service logic node 115 can consult the event context cache 105 to determine signaling event information. Notably, although only two service logic nodes are shown, those skilled in the art will recognize that more than two service logic nodes can be communicatively linked to the event context cache 105.

Figure 2:
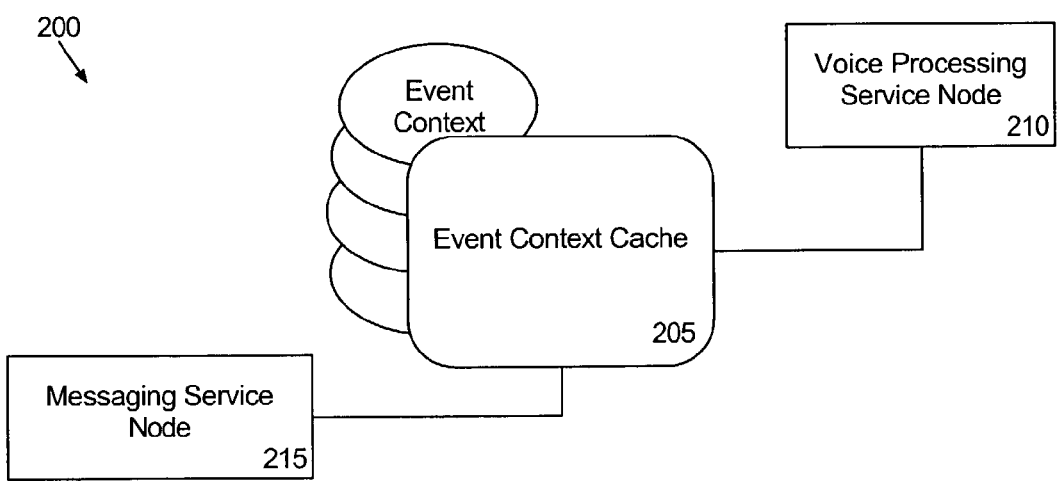
FIG. 2 is a schematic diagram illustrating an event context cache disposed between a voice processing node and a messaging node of a telephony system in accordance with the inventive arrangements disclosed herein.

FIG. 2 is a schematic diagram illustrating a system 200 having an event context cache 205 disposed between a voice processing service node 210 and a messaging node 215 of a telephony service system in accordance with the inventive arrangements disclosed herein. The voice processing service node 210 can include an ISDN User Part (ISUP) interface. The messaging node 210 can include a transaction capability application part (TCAP) interface.

Event contexts can be shared among the voice processing service node 210 and the messaging node 215 via the event context cache 205. Event contexts, as used herein, refer to the situation wherein a telephony service is split or distributed across two or more network nodes. Event contexts can be specified by one or more received events, can be determined, at least in part, by one or more telephony nodes, or can be specified by a combination of the two, depending upon the nature and complexity of the telephony service being executed. For example, TCAP number translations or other services which involve querying databases can involve several transactions between more than one telephony node.

In illustration, the messaging node 215 can include a service control point (SCP) and the voice processing service node 210 can include a voice server or an interactive voice response node. When one portion of service logic executing on one of the nodes, such as the messaging node 215, requires voice processing to complete a service, the messaging node 215 can transfer the call to the voice processing service node 210. The event context information relating to the call, for example a service to be executed at a target node or the node receiving the call as well as any determined caller data, is stored in the event context cache 205. Accordingly, from the event context cache 205, the voice processing service node 210 can determine information such as which service or voice processing service is to be executed for handling the received call as well as any caller data determined by the messaging node.

Figures 3, 4:
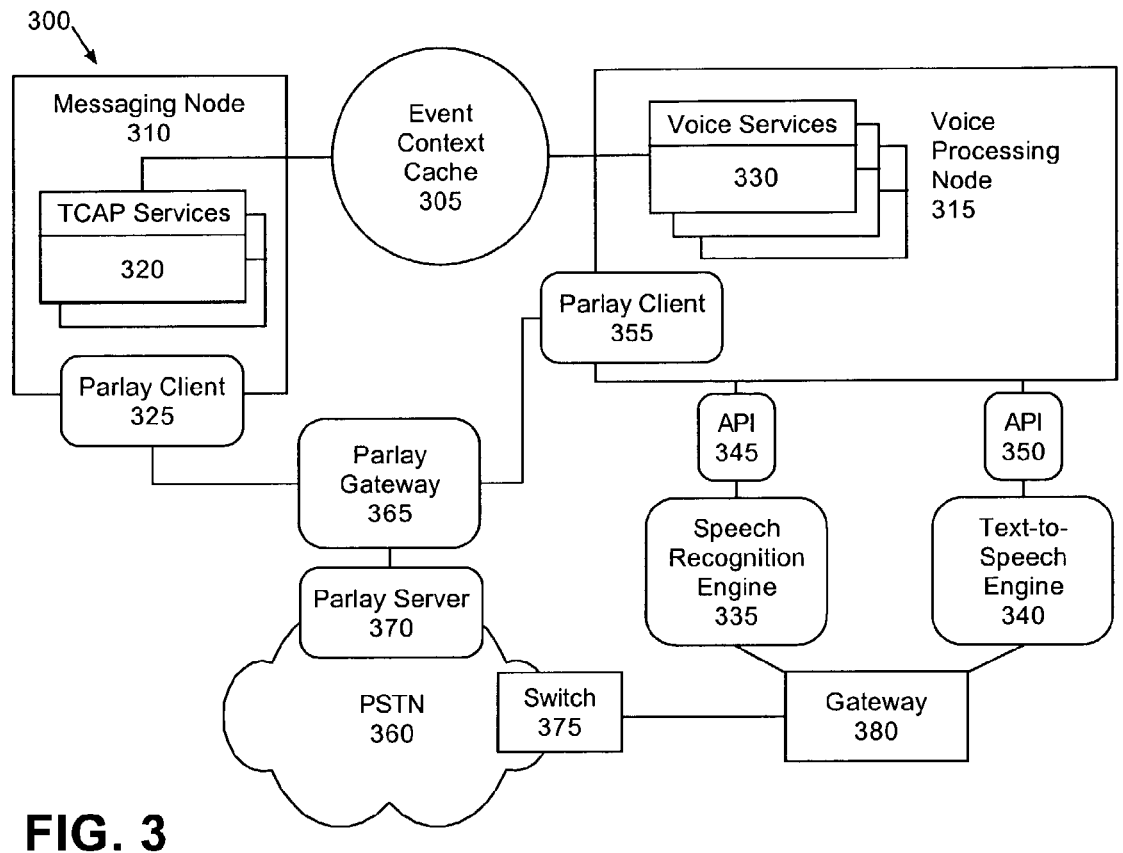
FIG. 3 is a schematic diagram illustrating a telephony system having a voice processing node and a messaging node in accordance with the inventive arrangements disclosed herein.
FIG. 4 is a schematic diagram illustrating one embodiment of the event context cache.

FIG. 3 is a schematic diagram illustrating a telephony system 300 in accordance with the inventive arrangements disclosed herein. As shown in FIG. 3, the system 300 can include an event context cache 305 which can be located between two or more nodes of the system 300. The context cache 305 can communicatively link a messaging node 310 with a voice processing node 315. The messaging node 310 and the voice processing node 315 can be "in-network", "out-of-network", or any combination thereof. The messaging node 310 can host and/or support services 320 such as Mobile Application Protocol (MAP), Short Message Service (SMS), and other services which run over TCAP. The messaging node 310 can include a Parlay client 325.

The voice processing node 315 can host and/or support various voice services 330, for example, any of a variety of voice-based interactive services such as information, directory services, and the like. The voice services 330 of the voice processing node 315 can communicate with a speech recognition engine 335 and a text-to-speech (TTS) engine 340 through application programming interfaces (APIs) 345 and 350 respectively. Similar to the messaging node 310, the voice processing node 315 can include a Parlay client 355.

The messaging node 310 and the voice processing node 315, utilizing the Parlay client of each respective node, can communicate with a public switched telephone network (PSTN) 360 through the Parlay gateway 365. Parlay provides an open set of APIs which enable services to operate across multiple platforms. Accordingly, the PSTN 360 can include a Parlay server 370 for interacting with the Parlay gateway 365. Voice communications can be provided to the voice processing node 315 from the PSTN 325 via a telephony switch 375. A gateway 380, for example a Voice over Internet Protocol (VoIP) gateway or other circuit-switched to packet-switched interface, can serve as an interface between the telephony switch 375 and the IP-based network. For example, audio can be provided from the telephony switch 375 to the gateway 380, which can convert the received audio to a format suitable for transmission over a packet-based network. The gateway 380 can provide audio to the speech recognition engine 335. Similarly, the gateway 380 can receive audio from the TTS engine 340 and provide the audio to the PSTN 360 via the telephony switch 375.

In operation, the messaging node 310 can receive a TCAP event from the PSTN 360 by way of the Parlay server 370, the Parlay gateway 365, and the Parlay client 325. Accordingly, the messaging node 310 can access the event context cache 305 to determine whether an event context associated with the received TCAP event exists in the event context cache 305. If so, then the messaging node 310 can refresh the event context cache entry. If not, the message processing node 310 can place a new entry in the event context cache 305. For example, the messaging node 310 can place an entry within the event context cache 305 specifying a calling directory number, a called directory number, as well as any voice or call processing applications, scripts, and/or associated data required for the execution of a call or voice processing service for interacting with a calling party.

The messaging node 310 can determine that, responsive to the TCAP event, a call is to be transferred to a particular voice service. Accordingly, the messaging node 310 can determine the applications to be executed to process the transferred call. Thus, in this case, the messaging node 310 can make an entry in the event context cache specifying the calling number, the called number, the directory number or address to which the call is to be transferred, as well as any applications and application parameters required for execution of the applications.

The voice processing node 315, upon receiving the call, can consult the event context cache 305 using the calling directory number and the called directory number specified by the incoming call to determine an entry. From the entry in the event context cache, the voice processing node 315 can obtain information such as the directory number to which the call is to be transferred as well as any applications to be executed and application parameters needed for execution of a specified application. The event context cache entries need only be retained for several seconds such that a receiving service or node, in this case the voice processing node 315, can access needed information for processing a received call. Otherwise, if no entry in the event context cache 305 is located for the received call, the voice processing node 315 can implement a recovery mechanism such as dropping the call, playing a message to the calling party, forwarding the call to a voice mail associated with the called or calling directory number, forwarding the call to an operator, or the like.

The voice processing node 315 then can implement any of the appropriate voice services 330 for processing the received call in accordance with the event context cache entry corresponding to the called and calling numbers. Any necessary speech and/or voice processing and TTS functions can be provided by the speech recognition engine 335 and the TTS engine 340, which can be accessed through APIs 345 and 350 respectively. Notably, a real-time streaming engine can be used as an interface between the gateway 380 and the speech recognition engine 335 and the TTS engine 340.

FIG. 4 is a table illustrating an exemplary implementation of the event context cache 305 of FIG. 3. As shown in FIG. 4, the called number and the calling number specified in a received event can be used to form a search key 405. Accordingly, event context data which is stored in the event context cache 305 can be associated with a search key derived from the calling number and the called number. When the voice processing node receives an event via Parlay, the voice processing node can access the event context cache 305 and search for an event context associated with the called number and calling number specified in the received event, thereby alleviating the need for a service-to-service messaging protocol. The messaging node can undertake a similar search function to determine whether an entry in the vent context cache 305 exists for a given event, and therefore, whether to make an entry or to refresh an entry.

Figure 5:
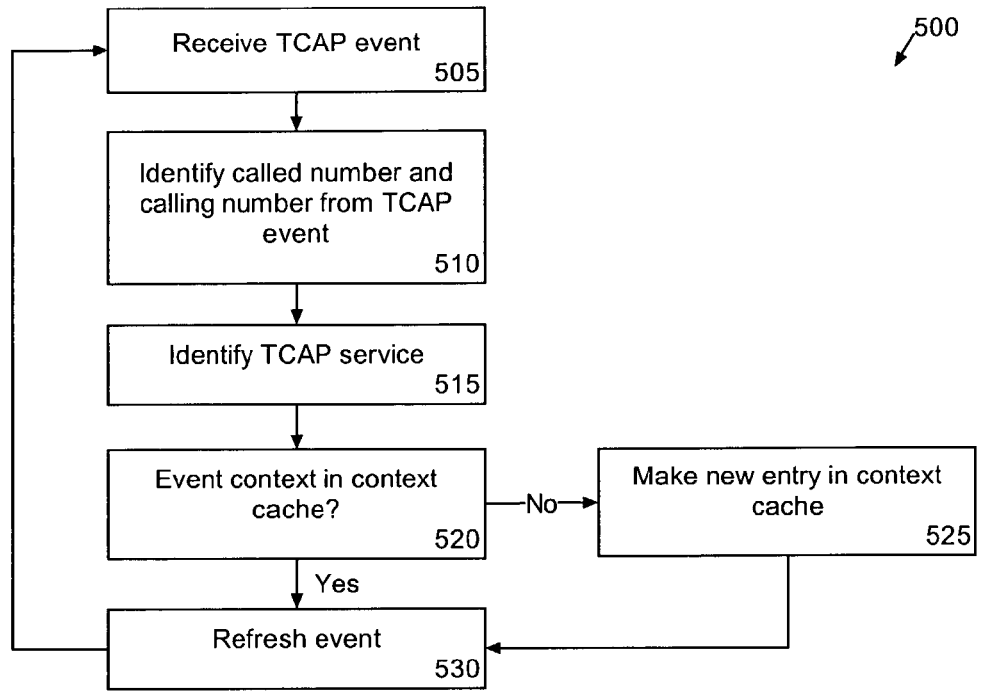
FIG. 5 is a flow chart illustrating a method of telephony event processing as performed by the system of FIG. 3.

FIG. 5 is a flow chart illustrating a method 500 of implementing transactional aspects of a telephony service as performed by the system of FIG. 3. The method can begin in a state wherein the system of FIG. 3 has instantiated at least one TCAP-based service. Accordingly, in step 505, the messaging node can receive a TCAP event from the PSTN via the Parlay network. In step 510, the messaging node can process the received TCAP event to identify the called number and the calling number. Additionally, in step 515, the TCAP service specified in the received event can be identified such that an appropriate TCAP-based service application can be used to process the received event.

In step 520, a determination can be made as to whether an entry corresponding to the received TCAP event has been made in the event context cache. If so, the method can proceed to step 530 where the entry can be refreshed. As noted, the entries within the event context cache can have a time-to-live parameter of several seconds. Although the messaging node can administer the event context cache, according to another embodiment, the event context cache can include necessary logic for monitoring the length of time an entry has been stored in the cache and purging the entry upon expiration of the time-to-live parameter.

If no entry corresponding to the received TCAP event is specified in the event context cache, the method can continue to step 525 where an entry can be made in the event context cache. The entry in the event context cache can include the calling directory number, the called directory number, one or more voice processing application addresses and/or references, as well as any parameter data that may be required by the specified voice processing applications. Additionally, any other information subsequently determined through execution of a TCAP-based service also can be written to the event context cache as service context data. As mentioned, the entries in the event context cache can be associated with, or referenced by, a key, for example a hash key, derived from the called directory number and the called directory number.

Figure 6:
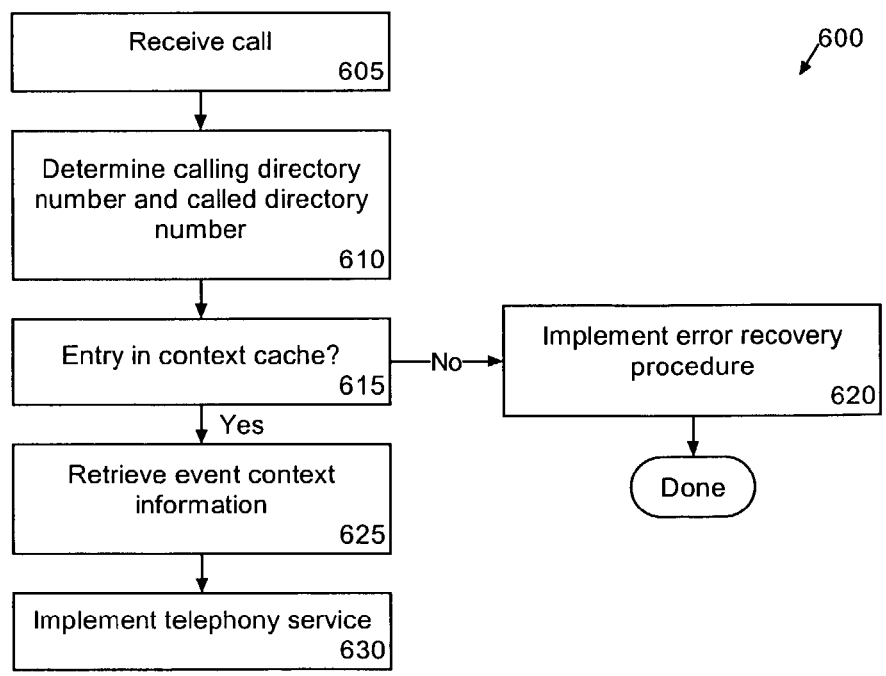
FIG. 6 is a flow chart illustrating a method of voice processing as performed by the system of FIG. 3.

FIG. 6 is a flow chart illustrating a method of call processing as performed by the system of FIG. 3. The method can begin in a state wherein the voice processing node of FIG. 3 has instantiated at least one voice service. Notably, the voice services can consult the event context cache upon execution, prior to completing a transaction, when an event is received via the Parlay network, and/or upon receiving a call. Accordingly, in step 605, a call can be received by the voice processing node via the gateway, for example, as a result of a call transfer initiated by a received TCAP event in the messaging node. In step 610, the calling directory number and the called directory number of the received call can be determined.

In step 615, a determination can be made as to whether an entry exists in the event context cache for the received call. The entries in the event context cache can be organized according to the calling directory number and the called directory number of a received call. The calling directory number and the called directory number can serve as a search key for accessing the event context cache. If no entry exists in the event context cache, then the method can continue to step 620, where a recovery procedure can be implemented. As mentioned, the recovery procedure can include playing a message to the caller, dropping the call, forwarding the call to a default voice mail address associated with the called or calling number, or forwarding the call to an operator. After the recovery procedure has been implemented, the method can end.

If an entry does exist in the event context cache for the received call, then the method can proceed to step 625. In step 625, the context data corresponding to the call can be retrieved from the event context cache. In step 630, one or more voice processing applications specified by the event context cache entry can be identified and executed to process the received telephone call.

The invention provides a solution for sharing event context data between two or more nodes and/or services in a telephony system. By providing an event context cache serving as an interface between nodes and/or services such as voice processing and messaging, the present invention eliminates the need for the coordinated implementation of a service-to-service messaging protocol within each telephony service node. In addition to eliminating the need for developing and maintaining coordinated service-to-service protocols within multiple service logic nodes, the present invention also frees much needed telephony computing resources, thereby reducing the cost of telephony service development, deployment, and maintenance.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of communication among telephony services using an event context cache comprising:
in a messaging telephony service, receiving a telephony event from a node in the public switched telephony network specifying a called directory number, a calling directory number, and event context information specifying a manner in which at least two different service logic components interact for processing the telephony event, wherein each service logic component provides a different type of service logic than is provided by each other service logic component;
storing said event context information as an entry within said event context cache, wherein said event context cache is accessible by at least one other telephony service;
associating said entry with a key for said event context cache, said key specified by said called directory number and said calling directory number; and
said telephony event being processed by said at least one other telephony service according to said event context information.

2. The method of claim 1, wherein said key is a hash key, said method further comprising:
generating said hash key with said called directory number and said calling directory number.

3. The method of claim 1, wherein said telephony event is received via a parlay interface.

4. The method of claim 1, wherein said at least one other telephony service is a voice processing service.

5. The method of claim 4, wherein said event context information comprises service context data specifying a voice processing event to be executed.

6. The method of claim 4, further comprising:
said voice processing service accessing said event context cache to determine how to process a received call.

7. The method of claim 6, wherein said messaging telephony service and said voice processing telephony service communicate without the use of a service-to-service messaging protocol.

8. The method of claim 1, further comprising:
releasing resources of said node in the public switched telephony network after receiving said telephony event.

9. The method of claim 1, further comprising:
removing said entry and associated key upon expiration of a predetermined amount of time.

10. The method of claim 1, further comprising:
receiving a subsequent telephony event;
determining whether event context information specifying a manner for processing said subsequent telephony event exists in said event context cache; and
if not, storing service context data for said subsequent telephony event as an entry within said event context cache and associating said entry with a second key for said event context cache, said second key specified by a called directory number and a calling directory number associated with said subsequent telephony event.

11. The method of claim 10, further comprising:
if event context information for said subsequent telephony event exists in said event context cache, refreshing said event context information.

12. A method of communication among telephony services using an event context cache comprising:
within a voice processing telephony service, receiving a service request from a node in the public switched telephony network, said service request specifying a calling directory number and a called directory number;
responsive to receiving said service request, determining a key using said calling directory number and said called directory number;
determining whether an entry comprising event context information exists in said event context cache which is associated with said key, wherein said event context information specifies a manner in which at least two different service logic components interact for processing the telephony event, each service logic component providing a different type of service logic than is provided by each other service logic component; and
if so, retrieving event context information from said entry in said event context cache and processing said received service request according to said event context information.

13. The method of claim 12, further comprising:
if not, executing a call recovery mechanism.

14. A machine-readable storage having stored thereon, a computer program having a plurality of code sections, said code sections executable by a machine for causing the machine to perform the steps of:
in a messaging telephony service, receiving a telephony event from a node in the public switched telephony network specifying a called directory number, a calling directory number, and event context information specifying a manner in which at least two different service logic components interact for processing the telephony event, wherein each service logic component provides a different type of service logic than is provided by each other service logic component;
storing said event context information as an entry within said event context cache, wherein said event context cache is accessible by at least one other telephony service;
associating said entry with a key for said event context cache, said key specified by said called directory number and said calling directory number; and
processing said telephony event by said at least one other telephony service according to said event context information.

15. The machine-readable storage of claim 14, wherein said key is a hash key, said method further comprising:
generating said hash key with said called directory number and said calling directory number.

16. The machine-readable storage of claim 14, wherein said telephony event is received via a parlay interface.

17. The machine-readable storage of claim 14, wherein said at least one other telephony service is a voice processing service.

18. The machine-readable storage of claim 17, wherein said event context information comprises service context data specifying a voice processing event to be executed.

19. The machine-readable storage of claim 17, further comprising:
said voice processing service accessing said event context cache to determine how to process a received call.

20. The machine-readable storage of claim 14, further comprising: releasing resources of said node in the public switched telephony network after receiving said telephony event.

21. The machine-readable storage of claim 14, further comprising:
removing said entry and associated key upon expiration of a predetermined amount of time.

22. The machine-readable storage of claim 19, wherein said messaging telephony service and said voice processing telephony service communicate without the use of a service-to-service messaging protocol.

23. The machine-readable storage of claim 14, further comprising:
receiving a subsequent telephony event;
determining whether event context information specifying a manner for processing said subsequent telephony event exists in said event context cache; and
if not, storing service context data for said subsequent telephony event as an entry within said event context cache and associating said entry with a second key for said event context cache, said second key specified by a called directory number and a calling directory number for said subsequent telephony event.

24. The machine-readable storage of claim 23, further comprising:
if event context information for said subsequent telephony event exists in said event context cache, refreshing said event context information.

25. A machine-readable storage having stored thereon, a computer program having a plurality of code sections, said code sections executable by a machine for causing the machine to perform the steps of:
within a voice processing telephony service, receiving a service request from a node in the public switched telephony network, said service request specifying a calling directory number and a called directory number;
responsive to receiving said service request, determining a key using said calling directory number and said called directory number;
determining whether an entry comprising event context information exists in said event context cache which is associated with said key, wherein said event context information specifies a manner in which at least two different service logic components interact for processing the telephony event, each service logic component providing a different type of service logic than is provided by each other service logic component; and
if so, retrieving event context information from said entry in said event context cache and processing said received service request according to said event context information.

26. The machine-readable storage of claim 25, further comprising:
if not, executing a call recovery mechanism.

* * * * *